3,745,136
AQUEOUS DISPERSION OF MULTI-LAYERED
VINYLIDENE CHLORIDE COPOLYMERS
Helmut Huhn, Walsrode, Horst Kuhn, Fallingbostel, and Helmut Meyer and Udo Tewes, Bomlitz, Germany, assignors to Wolff Walsrode Aktiengesellschaft, Walsrode, Germany
No Drawing. Filed July 9, 1971, Ser. No. 161,283
Claims priority, application Germany, July 10, 1970
P 20 34 257.8–44
Int. Cl. C08f 37/18, 15/40
U.S. Cl. 260—29.6 RB
7 Claims

ABSTRACT OF THE DISCLOSURE

A coating composition in the form of an aqueous dispersion for finishing cellulose-regenerates or plastics in sheet form wherein said coating material is in the form of spherical multi-layered solid particles each of which has an amorphous solid centre (a), a core (b) and a shell (c), which coating material is resistant to blocking and capable of being heat-sealed on flat surfaces.

PRIOR ART

Coating compositions of this kind are already known in the art. Some of the copolymers mentioned in the literature are prepared from a monomer mixture which contains about 70–95% by weight of vinylidene halides. These coatings are applied to flat surfaces, e.g. packaging foils, for the purpose of improving the properties of the foils to which they are applied, e.g. their permeability to gas, water vapour, fat or other materials and in order to render the foils capable of being sealed. This applies both to foils which are capable of being welded and to those which cannot be welded.

These and other advantages have meanwhile led to the used of copolymers which have a high polyvinylidene halide content for a wide variety of purposes and hence to a constant increase in production. This development has been accompanied by an improvement in the production processes and simplification in the methods of application of these products. Coating materials in the form of aqueous dispersions of the type mentioned above have already been disclosed, e.g. in British patent specification 773,231. Apart from the advantages already described above, coatings prepared from these aqueous dispersions impart good sliding properties to the support foils to which they are applied and the blocking effect, that is to say defects due to adjacent surfaces sticking together when rolled up, is reduced. The polymer particles in the aqueous dispersion, however, lose their predominantly amorphous structure fairly rapidly and go over into the more stable crystalline state, with the result that it becomes difficult to form a film from the dispersion and the sealing temperature becomes too high. If it is desired to reduce the crystalline portion in these polymer dispersions, the polyvinylidene halide content in the copolymer must be substantially reduced, e.g. according to German patent specification 821,615, but the other advantageous properties of these coatings which have already been described above and which are due to the polyvinylidene halide content, are then also reduced to a corresponding extent.

According to published German specification (Auslegeschrift) 1,250,577, attempts have been made to overcome this difficulty by mixing dispersions of a relatively amorphous type with dispersions of a relatively crystalline type. Although this method achieves a reduction in the blocking tendency of coatings produced from the aqueous dispersions of coating materials, a disadvantageous interaction between the two types of dispersions, which may lead to the formation of a coagulate within the aqueous dispersion cannot be avoided so that operational disturbances which are then liable to occur e.g. when circulating these dispersions with pumps or when applying these substances, cannot be eliminated. In addition, the formation of coagulates causes uneven application of the coating and impairment of the optical properties of the foil. Moreover, the blocking tendency of the foil is only slightly reduced and the relatively high sealing temperature, which is one of the few disadvantages of copolymers which have a high polyvinylidene halide content is only slightly reduced.

With a view to substantially reducing the sealing temperature, an aqueous dispersion of coating material containing polyvinylidene halide copolymers for the production of coatings on flat surfaces has been developed according to U.S. patent specification 3,309,330, in which the relatively amorphous and the relatively crystalline copolymer constituents are not simply present side by side in a mixture but arranged within one another in the form of layered copolymer particles. It is represented as an essential part of this invention that the relatively crystalline "hard" material forms the core of the particles around which a shell of relatively amorphous "soft" material is arranged. Although these aqueous dispersions of coating materials containing spherical particles with a relatively amorphous and therefore "soft" outer skin can be heat-sealed at substantially lower temperatures when they have been converted into the form of solid coatings, the products have a high tendency to blocking and poor sliding properties, disadvantages which must at all costs be avoided in materials processed in high speed packaging machines which may in some cases even contain hot filling material.

OBJECT OF THE INVENTION

The object of the invention is to provide an aqueous coating composition in the form of spherical multi-layered solid particles, which does not have any of the undesirable disadvantages referred to above.

The invention

According to the invention, this object is achieved by an aqueous dispersion of a coating material containing polyvinylidene halide copolymers wherein the coating material is in the form of spherical multi-layered solid particles each of which has an amorphous solid centre (a)
each of which has a core (b) of predominantly amorphous material
and each of which has a shell (c) of at least 50% crystalline material.

The solid centre (a) consists of a nuclear structure which by virtue of the method of preparation is already from the start in the form of a polymer, a core (b) of relatively amorphous material which is polymerised around this nucleus, and a shell (c) of relatively crystalline material polymerised around the core. These solid particles substantially retain their qualitative arrangement of layers before, during and after their use for the production of blocking resistant, heat-sealable coatings on flat surfaces.

The structure of the above mentioned coating material according to the invention results in outstanding properties in the lacquers produced from these coating materials because relatively crystalline and therefore hard thin outer skin referred to as the shell ensures very advantageous anti-blocking and sliding properties of the coated surface and at the same time imparts exceptionally good sealing properties to the surface because when the surface is sealed with the simultaneous application of pressure and heat, the hard, thin shell is broken and it is only then that the sealing process reaches the relatively amorphous substance of the core and partly exposes it, with the result that sealing can be achieved at very low temperatures.

The invention therefore for the first time succeeds quite surprisingly in providing a product which has both a low sealing temperature and a low blocking tendency. In accordance with the important role which the formation of a relatively thin shell has in this invention, the known process of nuclear polymerisation may be used for the production of the aqueous coating material according to the invention. This process of nuclear polymerisation is based on the principle that a certain quantity of finished dispersion is present as a nucleus on the basis of which further polymerisation is carried out so that no particles other than those produced by means of these nuclei can be formed. This subsequent polymerisation serves to produce two other layers which are formed around the nucleus (so called "solid centre") and which are known as "core" and "shell." The final thickness of these two layers depends among other things on the quantity of substances present in the dispersion which form these layers. In order to ensure that a sufficiently thin crystalline shell layer will be formed, the proportion of the shell substance should be between 5 and 40% by weight, based on the total amount of dispersed substance.

The substance used for the "core" may be any amorphous or "soft" substance present in the dispersion in this form, and the substance used for the "shell" may be any relatively crystalline or "hard" substance present in this form in the dispersion.

Apart from the advantageous properties already mentioned above of the aqueous coating materials according to the invention and of the coatings produced from them, especially the combination of exceptionally good sealing properties with exceptionally advantageous anti-blocking and sliding properties, these substances have the additional advantages of having a stability in storage and a capacity for film formation which are not in any way inferior to the corresponding properties of known products.

Although it has generally been found very advantageous to have the solid centre (a), core (b) and shell (c) of the spherical multi-layered solid particles of the aqueous dispersion consist of copolymers composed predominantly of polyvinylidene halides, it is also within the scope of the invention to have at least the shell consist predominantly of a homopolymer, e.g. a polymethylmethacrylate. Preferably within the aqueous dispersion the content of the solid is from 40% by weight to 65% by weight. The mean diameter of the said multi-layered solid particles is less than 400 m$\mu$. Advantageously the predominant number of said multi-layered solid particles has a diameter of 120 m$\mu$ to 200 m$\mu$. Particular satisfactory results as regards the above mentioned advantages of the aqueous coating materials according to the invention are obtained if care is taken to ensure, that the mean proportion of the part of the diameters of said shell (c) to the sum of diameters of said solid centre (a) and core (b) is in the range of from 1:7 to 1:60. Preferably the mean proportion of the part of the diameters taken up by the shell of the solid particle (a) to that taken up by the remainder of the multi-layered particle (a and b) has an average value of 1:30. Preferably the solid particles consist of 1 to 20% by weight of the said solid centre (a), 40 to 90% by weight of the said core (b) and 5 to 40% by weight of said shell (c).

If, while preserving the other advantageous properties of the aqueous coating material according to the invention, it is considered to be particularly important to obtain good sealing properties, in which case the crystalline shell layer must be kept very thin, the nuclear polymerisation must be so controlled in the following examples, as will be explained more fully hereinafter, that the proportion of the said solid centre (a) in the final multi-layered particles is 2 to 5% by weight, the proportion of said core (b) 77 to 93% by weight and the proportion of said shell (c) 5 to 18% by weight. The invention allows for a wide range of variation as regards the choice of copolymers to be used or prepared, provided only that the monomer mixtures used as starting material result in a relatively amorphous copolymer for the solid centre (a) and core (b) but a relatively crystalline copolymer for the shell (c).

To produce particles having an average size of 120 to 200 m$\mu$, the said solid centre (a), which should be present in polymerised form from the start, should have an average diameter of 40 to 60 m$\mu$ and be prepared from a monomer mixture composed of 80 to 99% by weight of vinylidene chloride and 1 to 20% by weight of acrylonitrile, whereas the core (b) of the multi-layered solid particles is advantageously copolymerised from a monomer mixture consisting of 70 to 90% by weight of vinylidene chloride and 0 to 20% by weight of a monomer selected from a group consisting of acrylonitrile and methyl methacrylate and 0.5 to 30% by weight of a monomer selected from a group consisting of ethyl acrylate and n-butyl methacrylate in order to obtain the outstanding properties expected in the aqueous coating material according to the invention, especially when the coating material is used for the production of coatings on flat surfaces. The outer layer of the multi-layered particles, known as the said shell (c), is advantageously prepared by copolymersing a composition of 90 to 99% by weight of vinylidene chloride and 1 to 8% by weight of a monomer selected from a group consisting of acrylonitrile, acrylic acid, methyl methacrylate and a mixture thereof or 0 to 9% by weight of a monomer selected from a group consisting of methyl acrylate, ethyl acrylate, acrylic acid or a mixture thereof.

Since the outstanding sealing properties depend particularly on the hardness of the outer layer or shell (c), the material used for this purpose according to the invention may equally well be a homopolymer consisting of 100% by weight of vinylidene halide.

According to a particularly advantageous embodiment of the invention, the aqueous coating material is characterised in that the solid centre (a) consists of a copolymer of 90% by weight of vinylidene chloride and 10% by weight of acrylonitrile, said core (b) consists of a copolymer of 88.5% by weight of vinylidene chloride and 10% by weight of acrylonitrile and 1.5% by weight of n-butyl methacrylate and the shell (c) consists of a copolymer of 95% by weight of vinylidene chloride and 5% by weight of a monomer selected from a group consisting of acrylonitrile, methyl methacrylate and a mixture thereof.

The aqueous dispersion according to the invention can be used in an advantageous way for coating foil which comprises applying said aqueous dispersion to said foil to be coated, converting the dispersion into a continuous surface film by drying it on the said surface of the foil, the dispersion containing 40 to 60% by weight of solid particles, being applied in an amount corresponding to 5 g. of solid particles per m.$^2$.

Although the product according to the invention is basically independent of the method used for its production provided only that the method invariably results in one and the same product by which the invention is realised, an advantageous process will now be disclosed to the expert with a view to providing him with a particularly easy and therefore cost-saving method of preparation without the invention being restricted to this or any part of this process which leads to the object of the invention.

According to this particularly interesting process which has already been briefly mentioned above as nuclear polymerisation process in order to form the solid centre (a), a certain quantity of nuclear dispersion is first prepared and this is introduced into the reaction vessel in its final polymerised state, and polymerisation is then continued on this substance with a monomer mixture I which is required for producing the subsequent core layer e.g. core (b), and finally monomer mixture II which is required for producing the outer layer or shell (c) of the spherical multi-layered solid particles is added portionwise only after monomer mixture I has been used up.

The finished aqueous coating material is then used for coating a foil in the usual manner and the properties of the coated foil are then investigated.

The above general outline of the method of preparation, construction of the product and properties of the product used will now be further described with the aid of the following examples without being restricted to these examples. The various methods of measurement used for determining the properties will now be briefly described.

(a) The blocking resistance was determined by the method of Umminger, using an apparatus of the type constructed by the firm Frank. This method of measurement enables the bond strength of plastics foils to be expressed by a fixed physical dimension. Two stamps each having a surface area of 2 cm.$^2$ are covered with foil and the two foils are placed togther with their film surfaces in contact and exposed to a surface pressure of 250 p./cm.$^2$ at a temperature of either 23° C. or 60° C. each for one hour the two foils which had been stretched over the surfaces of the stamps and which are now bonded together are separated by means of a torsion spring and electric motor, and the force required to separate them is read off a dial. The blocking values determined by this method are expressed in terms of p./cm.$^2$ where $p$=force in pond.

(b) The sliding property is determined by the ASTM method O 1894–63. This sliding test measures the bonding coefficient $\mu_H$ and sliding coefficient $\mu_G$, taking into account the following factors: draw-off rate, surface pressure, climatic conditions and ageing. A strip of foil is pulled from under a friction body at the rate of 15 cm. per minute and the tangential component of force resulting from the friction on the friction body is measured. The ratio of force between the tangential component and the normal component gives a direct measurement of the two coefficients $\mu_H$ and $\mu_G$. The force component may also be registered on a writing instrument.

(c) Sealing. An apparatus of the firm Joisten and Kettenbaum is used for determining the data for the beginning of sealing and strength of sealing or bond strength. The coated foils (film side to film side) are sealed together by means of a permanently heated sealing jaw which is pressed against an unheated sealing jaw under specified conditions of surface pressure, temperature and time (impulse sealing). The measurements are carried out on strips of foil 16 mm. in width, the strips being subjected to a peeling force by means of a tensile testing machine.

(d) Differential thermo analysis (DTA). The differential thermo analyses required for assessing the amorphous-crystalline properties of the high polymer dispersions according to the invention were carried out with a suitable apparatus of the firm Netzsch, Selb/Bavaria, West Germany. The said dispersions are freeze-dried at −40° C. for one hour at a pressure of 10$^{-1}$ mm. Hg to obtain the pure, unchanged polymer, and they are then tested by DTA after three hours tempering at 80° C.

The DTA results are shown after the tables which follow Examples 1 to 11. The tables summarize the data obtained in these examples for the structure and properties of the product according to the invention.

EXAMPLE 1

In accordance with the process which is to be further described hereinafter for producing the product according to the invention, a nuclear dispersion for forming the solid centre (a) is prepared from a first monomer mixture by polymerisation and to this dispersion there is added a second monomer mixture from which the core layers are formed round the solid centre, also by polymerisation. A third monomer mixture is then added to the resulting product consisting of the solid centre and the core to form the shell round the aforesaid solid centre and core products, again by polymerisation. The details of this process are as follows: 8800 g. of water, 200 g. of an n-alkyl sulphonate, 5 g. of ammonium persulphate, 5 g. of sodium pyrosulphite, 9000 g. of vinylidene chloride and 1000 g. of acrylonitrile (monomer mixture I) are introduced into an autoclave equipped with stirrer and reflux cooler and then heated to 33° C. and polymerised at about 33° C. to 34° C. A 50% by weight dispersion of particles which have an average diameter of 50 m$\mu$. is obtained. 2.3 kg. of this dispersion are removed and introduced into another autoclave equipped with stirrer and reflux cooler together with 30 kg. of water, 10 g. of ammonium persulphate, 10 g. of sodium pyrosulphite and 3 g. of a sodium n-alkyl sulphonate, and the reaction mixture is heated to 38° C. To prepare the core layer which is formed round the solid centre of the nuclear dispersion by polymerisation, monomer mixture II consisting of 25,500 g. of vinylidene chloride, 3000 g. of ethyl acrylate, from which the core will subsequently be formed by polymerisation, is added portionwise while vinylidene chloride which boils at this temperature is kept at constant reflux. When all the monomer mixture II has been used up, a dispersion of particles consisting of solid centre and core is obtained, round which an outer layer, called a shell is then constructed from another monomer mixture III by polymerisation of this mixture. The amount of monomer mixture II required is about ⅛ of the quantity of monomer required for producing the core layer, namely 3100 g. of vinylidene chloride, 240 g. of acrylonitrile and 50 g. of acrylic acid. In addition, 230 g. of a sodium n-alkyl sulphonate, 5500 g. of water, 10 g. of ammonium persulphate and 10 g. of sodium pyrosulphite are continuously added to the reaction mixture during the process of production of the core and shell in order to maintain the polymerisation reactions. The temperature of the reaction mixture is maintained at 38° C. to 39° C. during the whole polymerisation process. The finished dispersion has a solids content of 50% by weight and an average particle diameter of 160 m$\mu$.

The aqueous coating material according to the invention may be used in the form of a dispersion, e.g. for coating foils, the product being worked up from the aforesaid polymer by a usual method, e.g. by applying it from a vat, levelling out the application on the surface of the support by means of an air brush and then drying it in a heated shaft, the dispersion being at the same time converted into a continuous surface film. In this case, the dispersion according to the invention was applied to a biaxially stretched polypropylene film 20$\mu$ in thickness which had been provided with a bonding layer in the usual manner, the dispersion being applied in an amount corresponding to 5 g. of solids per m.$^2$. As a result of this application, the coated side of the polypropylene film acquired the excellent properties defined and summarized in the table following Examples 1 to 11 and already described above.

EXAMPLE 2

In this comparison Example 2, in order to demonstrate how comparatively poor the properties of a coating are if the coating has been prepared from an aqueous dispersion which instead of being built up of layers of solid centre, core and shell as in Example 1 is merely built up of solid centre and shell without the relatively amorphous, i.e. soft core substance, only a relatively crystalline shell which has been prepared from a monomer mixture of 31,000 g. of vinylidene chloride, 2340 g. of acrylonitrile and 500 g. of acrylic acid is formed round the solid centre. The other steps of the process and procedures are the same as in Example 1. The coating obtained imparts to the whole foil not only a cloudy, streaky appearance but also other disadvantageous properties the details of which are described in the concluding Table II.

EXAMPLE 3

In this example, a product is produced from qualitatively the same monomer mixture I, II and III as in Example 1 but the proportion of core layer to shell layer is changed from 90:10 to 80:20 with the result that the sealing strength is impaired, as explained after the table, although the other properties obtained are equally as good as in Example 1. Owing to the altered proportion of monomer mixtures for the core and the shell, 22,600 g. of vinylidene chloride, 2660 g. of methyl methacrylate and 1330 g. of ethyl acrylate are used for producing the core and thereafter another monomer mixture of 6270 g. of vinylidene chloride, 470 g. of acrylonitrile and 100 g. of acrylic acid is used for producing the shell layer.

EXAMPLE 4

This example differs from Examples 1–3 in that while the monomer mixture used for producing the solid centre is the same, a monomer mixture of 29,900 g. of vinylidene chloride, 3380 g. of acrylonitrile and 510 g. of n-butyl methacrylate, which results in an amorphous and therefore relatively "soft" polymer, is used for formation of the core and shell. Although a coating produced from this aqueous coating material has a clear appearance and provides for satisfactory sealing even at low temperatures, it is very unsuitable for machine processes. For further details, see enclosed Table II.

EXAMPLE 5

This example serves as a comparison to Example 4 to demonstrate that the poor blocking resistance and sliding properties of the product obtained according to Example 4 cannot be improved by qualitatively changing the composition of the core layer, for example by using a starting monomer mixture II of 28,400 g. of vinylidene chloride, 3340 g. of methyl methacrylate and 1670 g. of ethyl acrylate under otherwise the same experimental conditions and conditions of polymerisation as in Example 4.

EXAMPLE 6

The only difference between Example 6 and Example 4 is that while the qualitative composition of the monomer mixture used for producing the core remains the same, a third polymerisation stage is added for producing a relatively crystalline and therefore hard shell layer. The core layer is in this case produced from a monomer mixture of 20,700 g. of vinylidene chloride, 2340 g. of acrylonitrile and 355 g. of n-butyl methacrylate, and the shell layer is thereafter produced from a monomer mixture of 9000 g. of vinylidene chloride and 1000 g. of methyl methacrylate. This results in the production of an aqueous coating material from a dispersion in which the particles which are to form the coating are composed of 70% by weight of core layer and 30% by weight of shell layer. The blocking resistances and sliding properties are improved owing to the relatively thick and crystalline shell layer, but this improvement is obtained at the expense of "late" starting of the sealing process.

EXAMPLE 7

In this case, the core layer is produced from a monomer mixture of 26,550 g. of vinylidene chloride, 3000 g. of acrylonitrile and 450 g. of n-butyl methacrylate and the shell layer is produced from a monomer mixture of only 3060 g. of vinylidene chloride and 340 g. of methyl methacrylate. Owing to the much reduced thickness of the shell layer, the onset of sealing is also advantageously reduced as compared with that in Example 6 while the advantageous values for blocking resistance and sliding properties obtained in Example 6 are preserved.

EXAMPLE 8

In this case, the core layer is produced from a monomer mixture of 25,500 g. of vinylidene chloride, 3000 g. of methyl methacrylate and 1500 g. of ethyl acrylate and the shell layer is produced from a monomer mixture of 3230 g. of vinylidene chloride, 170 g. of acrylonitrile and 85 g. of acrylic acid. Coatings produced from these dispersions have the same advantageous sliding properties, blocking resistances and sealing properties as the products prepared according to Example 7. Since both in this example and in the previous example the proportion of core layer to shell layer in percent by weight remains constant at 90:10 while the qualitative composition of the monomer mixtures both in the core and in the shell have been changed, this example demonstrates that the composition of these monomer mixtures has no influence on the advantageous sliding, blocking and sealing properties of coatings produced from the aqueous coating materials according to the invention provided only that the core layer is relatively amorphous and the shell layer relatively crystalline.

EXAMPLE 9

If, on the other hand, the core layer is prepared as in this example, from a monomer mixture of 22,000 g. of vinylidene chloride and 1400 g. of methyl methacrylate and the shell layer from a monomer mixture of 8850 g. of vinylidene chloride, 9000 g. of acrylonitrile and 150 g. of n-butyle methacrylate, the core layer obtained is relatively crystalline and the shell layer relatively amorphous. Dispersions of this type have been prepared according to the principle described in U.S. patent specification 3,309,330 and owing to the predominantly amorphous and therefore "soft" shell layer they have advantageous sealing properties but very poor blocking and sliding properties.

EXAMPLE 10

The dispersion prepared according to this example is qualitatively similar in the structure of all three layers of the solid particles, solid centre, core and shell, to the dispersion according to the invention prepared in Example 3 except that acrylonitrile is replaced by ethyl acrylate in the shell layer and that the core layer is slightly thicker and the shell layer correspondingly thinner. The sliding, blocking and sealing properties shown in the table demonstrate that these changes have no adverse effect on the use properties of coatings produced from such dispersions.

EXAMPLE 11

In this case, the qualitative structure of the core is similar to that in Example 1 but the structure of the shell is simpler, being in the form of a homopolymer.

Preparation of the nuclear dispersion is in this case the same as in the previous Examples 1–10 but the core dispersion is prepared from a monomer mixture of 26,900 g. of vinylidene chloride, 3170 g. of methyl methacrylate and 1590 g. of ethyl acrylate. Corresponding to this relatively large quantity of monomer mixture used, the proportion of core in percent by weight is increased to 95% so that the shell layer, although highly crystalline, amounts to only 5% by weight of the copolymer and has been polymerised from 1680 g. of vinylidene fluoride.

Foil coatings produced from these aqueous coating materials according to the invention have very good blocking and sliding properties as well as good sealing properties.

After the tables which now follow, the data shown in the tabulated lists relating to the structure and properties of the aqueous coating materials prepared according to Examples 1–11 and of the coatings produced from them, are investigated and assessed from a comparative point of view.

The symbols in Table I have the following meaning:

VDC: Vinylidene chloride
AN: Acrylonitrile
MM: Methyl methacrylate
MA: Methyl acrylate
E Ac: Ethyl acrylate
n-BM: n-butyl methacrylate
AC: Acrylic acid
VDF: Vinylidene fluoride The symbols in Table II have the following meaning:

DTA: Differential thermo analysis
$\mu$S: Coefficient of static friction
$\mu$K: Coefficient of kinetic friction Comparison Example 2 then consists only of a copolymer which has a high polyvinylidene chloride and polyacrylic acid content and which according to DTA and the optical test is crystalline and cloudy in appearance and consequently has a very late onset of sealing. Copolymers which are substantially amorphous and therefore "soft" are obtained according to Example 4 or 5. These products therefore have a very "early," i.e. low sealing onset and good sealing strength but compared with the "hard" copolymer according to Example 2 the good blocking resistance and sliding properties of these products is to a large extent lost and these products are therefore very difficult or even impossible to work up on machines. If these two types of products from Examples TABLE I
[Structure of spherical multi-layered solid copolymer particles in aqueous dispersion]

| | Examples | | | | | | | | | | |
|---|---|---|---|---|---|---|---|---|---|---|---|
| | 1 | 2 | 3 | 4 | 5 | 6 | 7 | 8 | 9 | 10 | 11 |
| The following are according to the invention | x | | (x) | | | (x) | x | x | | x | x |
| Solid centre: | | | | | | | | | | | |
| Proportion of total structure in percent by weight | 3.3 | 3.3 | 3.3 | 3.3 | 3.3 | 3.3 | 3.3 | 3.3 | 3.3 | 3.3 | 3.3 |
| Percent composition of "nucleus": | | | | | | | | | | | |
| VDC | 90 | 90 | 90 | 90 | 90 | 90 | 90 | 90 | 90 | 90 | 90 |
| AN | 10 | 10 | 10 | 10 | 10 | 10 | 10 | 10 | 10 | 10 | 10 |
| Core: | | | | | | | | | | | |
| Proportion of total structure in percent by weight | 87 | | 77.3 | 96.7 | 96.7 | 67.6 | 87 | 87 | 67.6 | 81.3 | 91.9 |
| Percent composition of "core": | | | | | | | | | | | |
| VDC | 85 | | 85 | 88.5 | 85 | 88.5 | 88.5 | 85 | 94 | 88.5 | 85 |
| AN | | | | 10 | | 10 | 10 | | | 10 | |
| MM | 10 | | 10 | | 10 | | | 10 | 6 | | 10 |
| E-Ac | 5 | | 5 | | 5 | | | 5 | | | 5 |
| n-BM | | | | 1.5 | | 1.5 | 1.5 | | | 1.5 | |
| Shell: | | | | | | | | | | | |
| Proportion of total structure in percent by weight | 9.7 | 96.7 | 19.4 | | | 29.1 | 9.7 | 9.7 | 29.1 | 15.4 | 4.8 |
| Percent composition of the "shell": | | | | | | | | | | | |
| VDC | 93 | 93 | 93 | | | 90 | 90 | 95 | 88.5 | 93 | |
| VDF | | | | | | | | | | | 100 |
| AN | 7 | 7 | 7 | | | | | 5 | 10 | | |
| MM | | | | | | 10 | 10 | | | | |
| E-Ac | | | | | | | | | 1.5 | | |
| n-BM | | | | | | | | | | 7 | |
| Ac[1] | 1.5 | 1.5 | 1.5 | | | | | 2.5 | | 2.5 | |
| Ratio of core to shell | 90:10 | 0:100 | 80:20 | 100:0 | 100:0 | 70:30 | 90:10 | 90:10 | 70:30 | 84:16 | 95:5 |

[1] Acrylic acid is just incompletely incorporated in the copolymer substance.

TABLE II
[Properties of the spherical multi-layered solid copolymer particles in aqueous dispersion and of the coatings produced from them]

| | Examples | | | | | | | | | | |
|---|---|---|---|---|---|---|---|---|---|---|---|
| | 1 | 2 | 3 | 4 | 5 | 6 | 7 | 8 | 9 | 10 | 11 |
| The following are according to the invention | x | | (x) | | | (x) | x | x | | x | x |
| Solid centre | Soft | Soft | Soft | Soft | Soft | Soft | Soft | Soft | Soft | Soft | Soft. |
| Core | Soft | Hard | Hard | Soft | Soft | Hard | Soft | Soft | Hard | Soft | Soft. |
| Shell | Hard-thin | | Hard-thick | | | Hard-thick | Hard-thin | Hard-thin | Soft-thick | Hard-thin | Hard-thin. |
| Sealing layer | Soft core | Hard core | Hard shell | Soft core | Soft core | Hard shell | Soft core | Soft core | Soft shell | Soft core | Soft core. |
| Onset of sealing | Early | Late | Late | Early | Early | Late | Early | Early | Early | Early | Early. |
| Strength of seal, p./15 mm. strips at: | | | | | | | | | | | |
| 110° C | 190 | 0 | 0 | 210 | 200 | 0 | 195 | 180 | 200 | 180 | 190. |
| 130° C | 265 | 40 | 60 | 270 | 275 | 270 | 250 | 270 | 250 | 250 | 270. |
| Number of layers | 3 | 2 | 3 | 2 | 2 | 3 | 3 | 3 | 3 | 3 | 3. |
| Structure of solid particles according to DTA | Amorphous | Crystalline | Amorphous | Amorphous | Amorphous | Amorphous | Amorphous | Amorphous | Crystalline | Amorphous | Amorphous. |
| Optical appearance | Clear | Cloudy | Clear | Clear | Clear | Clear | Clear | Clear | Cloudy | Clear | Clear. |
| Blocking resistance: | | | | | | | | | | | |
| 23° C | 0.3 | 0.6 | 1.4 | 4.1 | 8.4 | 0.3 | 0.3 | 0.6 | 1.7 | 1.4 | 0.4. |
| 60° C | 6 | 5 | 7 | >20 | 20 | 11 | 10 | 8 | 20 | 5 | 5. |
| Sliding properties: | | | | | | | | | | | |
| $\mu$ S | 0.2 | 0.6 | 0.4 | (1) | (1) | 0.2 | 0.2 | 0.1 | (1) | 0.2 | 0.2. |
| $\mu$ Kg | 0.2 | 0.4 | 0.3 | (2) | (2) | 0.2 | 0.2 | 0.1 | (2) | 0.2 | 0.2. |
| Stability of the dispersion in storage at 40° C, measured in days | 99 | 35 | 90 | 90 | 90 | 90 | 90 | 60 | 10 | 90 | 90. |

[1] No sliding.  [2] Only "stumbling."

The invention will now be further explained with reference to the above Tables I and II and some diagrams which are to follow.

If one ignores the negligible proportion of solid centre in the total structure of the product and the process of nuclear polymerisation in the preparation of the product and considers only the core and the shell, then Examples 2, 4, 5 and 9 correspond in principle to the prior art described at the beginning.

2 and 4 which are opposite to each other in properties are mixed, as has been proposed in principle in published German specification (Auslegeschrift) 1,250,577, then the blocking, sliding and sealing properties obtained are also only so-called mixed values, i.e. to the extent that the products from Example 2 are progressively improved, e.g. in the properties of onset of sealing and sealing strength at relatively low sealing temperatures with increasing amounts of products from Example 4 or 5 mixed with them, they suffer a corresponding loss in their advantageous blocking and sliding properties. This is clearly illustrated in the following table:

DTA curve I of a "hard" dispersion shows relatively high crystallinity, the evidence for which is provided by the correspondingly high range of melting temperatures

| Dispersion mixture (percent by weight) according to— | | Blocking resistance (p./cm.²) | | Sliding properties | | DTA | Onset of sealing | Sealing strength at 120° C. | Stability in storage at 40° C. |
|---|---|---|---|---|---|---|---|---|---|
| Example 2, crystalline hard | Example 4, amorphous soft | 23° C. | 60° C. | μS | μK | | | | |
| 100 | 0 | 0.6 | 5 | 0.6 | 0.4 | Crystalline | Late | 0 | Low. |
| 60 | 40 | 2.1 | 10 | No sliding, only "stumbling" | | ...do... | Medium | | Low. |
| 20 | 80 | 1.2 | 14 | No sliding, only "stumbling" | | Amorphous | Early | | Low. |
| 10 | 90 | 2.7 | >20 | No sliding, only "stumbling" | | ...do... | ...do... | | Low. |
| 0 | 100 | 4.1 | >20 | No sliding, only "stumbling" | | ...do... | ...do... | 250 | Good. |

Although the method employed in Example 9 (based on the principle of U.S. patent specification 3,309,330) with a view to overcoming these disadvantages and obtaining improved results involves the production of a multi-layered structure of such dispersed copolymer particles, it does not achieve advantageous results because the outer layer (shell) is relatively amorphous whereas the core layer is relatively crystalline in structure. The structure determined by DTA is therefore crystalline and the appearance of these coatings is cloudy. To this is added the fact that the product responds very badly to working up in machines and the dispersion is very unstable in storage, being stable for only 10 days at a temperature of 40° C. If on the other hand coatings on sheets are produced from a copolymer according to the invention as described in Example 1, which has a "soft" core and "hard" shell, then both the sealing properties and the blocking resistances and sliding properties obtained are very advantageous, as shown in the above Tables I and II. Composite foils covered with such coatings can therefore be processed very satisfactorily on high-speed packaging machines since they can be very smoothly worked up in machines by virtue of their advantageous blocking resistances and sliding properties and at the same time can be sealed very rapidly only at low sealing temperatures. The exact differences between chemically homogeneous, hard particles, chemically homogeneous, soft particles and chemically heterogeneous particles with a soft core and hard shell are shown clearly in the graphic representation of the DTA values in the following table.

and relatively high melt enthalpy. It is difficult to form films from such dispersions and moreover the films produced have poor optical characteristics and disadvantageously high sealing temperatures although their blocking and sliding properties are advantageously low.

The behaviour of particles of a "soft" dispersion in DTA is shown in curve II. These particles are therefore substantially amorphous, a fact which can also be recognised from their low range of melting temperatures and low melt enthalpy. In this case, the greater ease of film formation and advantageously low sealing temperatures are offset by the very poor blocking and sliding properties.

The lowest curve III was obtained from particles of a dispersion according to the invention which had a chemically heterogeneous structure ("soft" core and "hard" shell). The multilayered particles are present in amorphous form in the dispersion in spite of their relatively crystalline shell. The range of melting temperatures is orientated on this amorphous structure while the melt enthalpy is intermediate between that of the "soft" and of the "hard" dispersion. However, the "hard" shell layer which causes or at least promotes very good blocking and sliding properties can easily be penetrated by the action of hot sealing tools so that the predominantly amorphous core layers make contact with each other only during the sealing process and it is only as a result of this that the product shows an early onset of sealing and good sealing strengths at relatively low temperatures.

Graphic representation of DTA

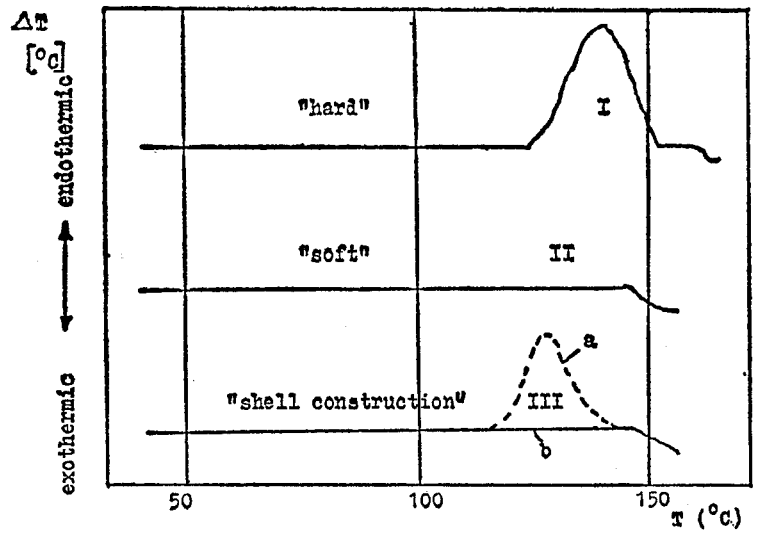

Diagram II below gives a general overall view of the sealing properties of the various coating products summarised in the table:

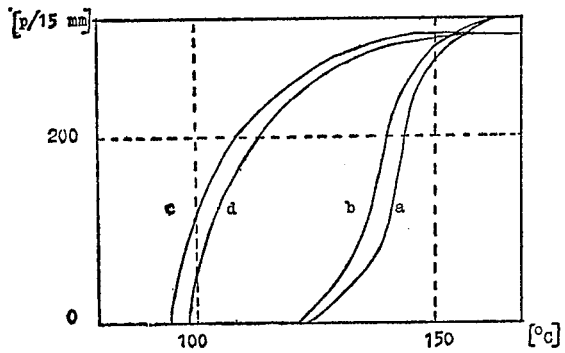

The symbols in the above diagram have the following meaning:

*a*: Sealing properties of a 100% "hard" type of solid particle according to Example 2;

*b*: Sealing properties of a multi-layered type having a thick, relatively crystalline shell (proportion of soft core to hard shell 80:20 or 70:30, see Examples 3 and 6);

*c*: Sealing properties of types composed of 100% "soft" substance, see Examples 4 and 5;

*d*: Sealing properties of multi-layered types according to the invention having a relatively amorphous core and relatively crystalline shell (proportion of soft core to hard shell 90:10, see Examples 1, 7, 8, 10 and 11).

The following conclusions can be drawn from this digram which is supplementary to the absolute values of sealing strength shown in Table II:

Coatings prepared from dispersions of solid particles which are single-layered (apart from the solid centre) and which have a "hard" layer structure (a) have an adequate sealing strength of 200 p./15 mm. only at a very high temperture. Types of coatings which differ from those mentioned above only in that they have a "soft" structure (c) reach the necessary sealing strength of 200 p./15 mm. at a temperature of only about 110° C. but since coatings of this type (c) have very poor blocking and sliding properties (see Table II, Examples 4 and 5) while on the other hand coatings of type (a), which have good blocking and sliding properties, reach the necessary sealing strength of 200 p./15 mm. only at very high temperatuers of about 140° C. (which necessitates e.g. reduction in the speed of high-speed packaging machines), the only coatings in which the defects in this field which have to this day not been overcome could be successfully eliminated were the types of coatings according to the invention which are produced from aqueous coating materials consisting of multi-layered solid particles which have a thick, "soft" core and a thin, "hard" shell. On the other hand, the above diagram also shows the great importance of the thickness of the shell in these multi-layered particles, as for instance:

Thus if the "soft" core contains only about 70 to 80% of the total quantity of copolymer and the "hard" shell contains 20 to 30% of the total quantity of copolymer (type b, see Examples 3 and 6) then the sealing strength of 200 p./15 mm. is reached only at temperatures of about 140° C. in spite of the chemically heterogeneous multi-layered structure of these particles. This proves that the "hard," thick shells are not penetrated in the sealing process so that sealing consists of "shell sealing," that is to say that it takes place in the shell without the predominantly amorphous solid centre substance taking part in the process to any significant extent.

If, on the other hand, coatings which are capable of being sealed are produced from aqueous coating materials in which only 5 to 15% of the total substance of each heterogeneous solid particle consists of "hard" shell and 85 to 95% of "soft" core (see type d in diagram II and Examples 1, 7, 8, 10 and 11 in Tables I and II) then the coating behaves in the sealing process as if it consisted entirely of "soft" substance, i.e. the sealing strength of 200 p./15 mm. is already reached at a temperature of about 110° C. to 120° C. Sealing is therefore a "core sealing."

The qualitative and quantitative composition of the copolymers of the core and the shell may, of course, be varied within the given proportions of the thickness of the core to the thickness of the shell, and for this purpose reference may be made at this point to the relevant variations indicated in Examples 1, 7, 8, 10 and 11 of the invention. Referring now to the revelant variations in absolute values shown in Table II under the column "sealing strength," additional measurements carried out have shown that at sealing temperatures of 120° C., coatings produced from the products of the invention according to Example 1 have a sealing strength of 240, those produced from products according to Example 7 have a sealing strength of 250 and those produced from products according to Example 8 have a sealing strength of 245 whereas the corresponding sealing strengths obtained in comparison Examples 2 and 3 are only 0 and 5, respectively. Even at a temperature of 140° C. the sealing strength p./15 mm. in Example 2 is only 160 whereas in Example 7 according to the invention the sealing strength is already 195 at a temperature 30° C. lower than this, namely at 110° C.

Another advantage of the dispersion produced with a shell structure is that its stability in storage in considerably better than that of "hard" types of dispersions and substantially equal to that of "soft" types of dispersions.

It is also in accordance with the invention that the aqueous coating materials according to the invention and the coatings produced from them may contain various additives, e.g. antiblocking and sliding agents (for example waxes and colloidal silicic acid), $p_H$ buffers, pigments and dyes and antistatic agents. The aqueous coating materials may, of course, be used with or without adhesifying intermediate layers or other applications, depending on the nature of the foil used as support. The coating materials according to the invention may be applied either to flat or to tubular foils and either on one or both sides. Furthermore, when the coating materials have consolidated to a firm coating, one or more additional coatings or foils of various types may be applied to them with or without bonding agents.

The support foils used may be flat sheetings made of regenerated cellulose or cellulose derivatives or they may be plastics foils made of polyolefines, e.g. polyethylene or polypropylene, but support foils made of polyesters such as polyethylene terephthalates, polycarbonates, polystyrene, polyvinyl halides, polyvinyl alcohols or starch compounds or alginate compounds are equally suitable. The above mentioned support foils, of course, also contain several of these substances in the form of mixtures or in the form of multi-layered foils.

If the support foils used are capable of being stretched, the dispersed coating materials according to the invention may be applied before or after stretching of the support foils. Any known type of stretching may be applied, such as longitudinal stretching, transverse stretching, longitudinal and transverse stretching carried out in succession or simultaneous longitudinal and transverse stretching. If the stretching operation following the application of the dispersion to the support foil includes a thermo fixing stage or only a heating stage, one operational stage can be saved in that the thermo fixing temperature applied to the support foil may serve at the same time to bring about film formation, i.e. to convert the dispersed coating material into a continuous coating. This applies both to flat foils and to tubular foils.

Lastly, the invention may also be carried out in conjunction with printing processes. Thus the support foil which is to be coated with the aqueous dispersion according to the invention may already be printed on one or both sides, and if the foil has been printed on the side which is to be coated, an excellent counterprint image is obtained. Equally well, when the coating material according to the invention has been converted into a coating on the support foil, this coating may be printed in monochrome or polychrome by a subsequent printing process.

Self-supporting films may also readily be produced from the aqueous coating material according to the invention, for example by coating a hydrophobic and copolymer repellent endless moving support band, the aqueous coating mass according to the invention being applied and distributed on this band and consolidated on it. Since the dispersion according to the invention is highly adaptable to changes in form and shape, it can be applied to an endless sheeting of the type described above which has a surface relief, the dispersion being thereby converted into a self-supporting foil which then carries a negative of this relief. This is of practical importance for the application of weaving patterns or longitudinal and transverse grooves.

The realisation of the invention is not restricted to the forms of representation and use indicated here.

What we claim is:

1. An aqueous dispersion of a coating material containing polyvinylidene halide copolymers wherein the coating material is in the form of spherical multi-layer solid particles having mean particle diameters of less than 400 millimicrons each of which has an amorphous solid center (a) consisting essentially of a copolymer of 80–99% by weight of vinylidene chloride and 1–20% by weight of acrylonitrile; said solid center being enclosed by a core (b) of predominantly amorphous material consisting essentially of a copolymer of about 70–90% by weight of vinylidene chloride, about 0–20% by weight of acrylonitrile or methyl methacrylate and about 1.5–30% by weight of ethyl acrylate or n-butyl methacrylate; said core being enclosed by a thin shell (c) of at least 50% crystalline material comprising 5–40% by weight of said particles and consisting essentially of a copolymer of about 90–99% by weight of vinylidine chloride, about 1–8% by weight of a monomer selected from a group consisting of acrylonitrile, acrylic acid, methyl methacrylate and mixtures thereof, and about 0–9% by weight of a monomer selected from a group consisting of methyl acrylate, ethyl acrylate, acrylic acid or mixtures thereof.

2. The aqueous dispersion of claim 1, wherein the content of the solid is from 40% by weight to 65% by weight.

3. The aqueous dispersion of claim 1, wherein the predominant number of said multi-layered solid particles has a diameter of 120 m$\mu$ to 200 m$\mu$.

4. The aqueous dispersion of claim 1, wherein the mean proportion of the part of the diameters of said shell (c) to the sum of diameters of (a) and (b) is in the range of from 1:7 to 1:60.

5. The aqueous dispersion of claim 4, wherein the mean proportion of the part of the diameters of said shell (c) to the sum of diameters of (a) and (b) is 1:31.

6. The aqueous dispersion of claim 1, wherein the solid particles consist of 1–20% by weight of the solid centre (a), 40–90% by weight of the said core (b) and 5–40% by weight of said shell (c).

7. The aqueous dispersion of claim 1, wherein said solid centre (a) consists of a copolymer of 90% by weight of vinylidene chloride and 10% by weght of acrylonitrile, said core (b) consists of a copolymer of 88.5% by weight of vinylidene chloride and 10% by weight of acrylonitrile and 1.5% by weight of n-butyl methacrylate, and said shell (c) consists of a copolymer of 95% by weight of vinylidene chloride and 5% of a monomer selected from a group consisting of acrylonitrile, methyl methacrylate and a mixture thereof.

References Cited

UNITED STATES PATENTS

| 3,108,017 | 10/1963 | Messwarb et al. | 117—138.8 |
| 3,291,768 | 12/1966 | Pfluger et al. | 260—29.6 |
| 3,309,330 | 3/1967 | Settlage | 260—29.6 |
| 3,657,172 | 4/1972 | Gallagher et al. | 260—29.6 |

MELVIN GOLDSTEIN, Primary Examiner

U.S. Cl. X.R.

117—138.8 A, E, F, PV, UA; 161—183, 231, 249, 254; 260—29.6 RW, 884